United States Patent
Lazzaro et al.

(10) Patent No.: US 9,657,484 B2
(45) Date of Patent: May 23, 2017

(54) RAPID DEPLOYMENT COMMUNICATIONS TILE

(71) Applicant: The Government of the United States, as represented by the Secretary of the Army, Washington, DC (US)

(72) Inventors: Matthew Lazzaro, Churchville, MD (US); William Toth, Ocean, NJ (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/620,707

(22) Filed: Feb. 12, 2015

(65) Prior Publication Data
US 2016/0237684 A1    Aug. 18, 2016

(51) Int. Cl.
    *E04F 15/10*    (2006.01)

(52) U.S. Cl.
    CPC ...... *E04F 15/105* (2013.01); *E04F 2201/095* (2013.01); *E04F 2201/098* (2013.01); *E04F 2290/02* (2013.01)

(58) Field of Classification Search
    CPC ........... E04C 2/521; E04F 15/02038; E04F 2201/095; E04F 15/02; E04F 15/105; E04F 2201/098; E04F 2290/02; H02G 3/285; H02G 3/283; H02G 3/383; H02G 3/385
    See application file for complete search history.

(56) References Cited

U.S. PATENT DOCUMENTS

| | | | |
|---|---|---|---|
| 5,467,609 A | 11/1995 | Feeney | |
| 5,511,138 A * | 4/1996 | Lebby | G02B 6/30 385/129 |
| 6,694,689 B1 | 2/2004 | Scott et al. | |
| 7,173,070 B2 | 2/2007 | Koffler | |
| 7,315,793 B2 | 1/2008 | Jean | |
| 7,427,050 B2 * | 9/2008 | Stahl, Sr. | F16L 5/02 174/98 |
| 7,716,895 B2 * | 5/2010 | Fairorth | E04H 3/28 472/75 |
| 8,215,642 B2 | 7/2012 | Macura et al. | |
| 8,615,937 B1 * | 12/2013 | Heim | E04F 15/105 362/153 |
| 8,760,877 B2 | 6/2014 | Bhattacharya et al. | |
| 2004/0222896 A1 | 11/2004 | Power et al. | |

(Continued)

FOREIGN PATENT DOCUMENTS

GB         1034723 A * 7/1966 ............. E04F 15/10

*Primary Examiner* — Adriana Figueroa
*Assistant Examiner* — Jessie Fonseca
(74) *Attorney, Agent, or Firm* — Ronald Krosky; Azza Jayaprakash (57) ABSTRACT

Various embodiments are described that relate to a rapid deployment communications tile. As opposed to running various data and/or power wires, a construction crew can use set of tiles that have built in data and/or power transmission capabilities. These tiles can be keyed such that they interlock together to form a relatively uniform surface, such that the surface can also be used as a floor. Further, the tiles can have hardware components that enable the data and/or power transmission capabilities. These hardware components can be environmentally protected such that their performance is not subject to environmental factors.

20 Claims, 10 Drawing Sheets

(56) References Cited

U.S. PATENT DOCUMENTS

| | | | |
|---|---|---|---|
| 2004/0226235 A1* | 11/2004 | Stempinski | H02G 3/385 52/220.2 |
| 2005/0178034 A1* | 8/2005 | Schubert | G09F 9/33 40/605 |
| 2007/0277457 A1 | 12/2007 | Langston et al. | |
| 2008/0238216 A1 | 10/2008 | Heidmann | |
| 2009/0147504 A1* | 6/2009 | Teeters | F21V 23/06 362/153 |
| 2010/0188842 A1 | 7/2010 | Yohananoff | |
| 2011/0067340 A1 | 3/2011 | Shapiro et al. | |
| 2011/0104434 A1 | 5/2011 | Masanek, Jr. et al. | |
| 2012/0210670 A1 | 8/2012 | Moller, Jr. | |
| 2014/0226329 A1* | 8/2014 | Oraw | H01L 25/0753 362/235 |
| 2015/0374264 A1* | 12/2015 | Haas | G01V 9/00 73/862.541 |

* cited by examiner

RAPID DEPLOYMENT COMMUNICATIONS TILE

GOVERNMENT INTEREST

The innovation described herein may be manufactured, used, imported, sold, and licensed by or for the Government of the United States of America without the payment of any royalty thereon or therefor.

BACKGROUND

In a modern environment, electrical power and data communication can be assets in achieving a goal. In one example, a speaker can speak at a podium on a stage. Electrical power can be used to provide lighting for the speaker and to provide sound amplification through a microphone and speaker system. Similarly, data communication can be used to have a presentation transferred from a personal electronics device of the speaker to a projector. When the speaker speaks at a permanent structure the goal can be easily achieved due to access to the electrical power and data communication. However, in a non-permanent structure these assets can be more difficult to obtain.

SUMMARY

In one embodiment, a system comprises a first tile that comprises a conduit and an engagement portion. The conduit can transmit a media upon the first tile. The engagement mechanism can cause the conduit to operatively couple with a second tile such that the media travels upon the conduit of the first tile in connection with travelling upon the second tile.

In one embodiment, a system comprises a supply tile, an access tile, and a transmission tile. The supply tile can be configured to supply a media. The access tile can be configured to afford access to the media. The transmission tile can be configured to transmit the media supplied by the supply tile to the access tile. The supply tile and the transmission tile can be operatively coupled together and interconnect with one another in a keyed manner. The transmission tile and the access tile can be operatively coupled together and interconnect with one another in a keyed manner.

In one embodiment, a system comprises a recognition component, an analysis component, and an identification component. The recognition component can recognize a situation where a transmission failure occurs in a tile environment, where the tile environment transmits media from one location of the tile environment to another and where the tile environment is a plurality of interlocking tiles that are operatively coupled to one another. The analysis component can analyze the tile environment to produce an analysis result. The identification component can identify a failure tile of the tile environment that causes the transmission failure, where the failure is identified through use of the analysis result. The recognition component, the analysis component, the identification component, or a combination thereof can be implemented, at least in part, by way of non-software.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

In a battlefield tactical situation, power and data can be valuable resources. In one example, a combatant force can take control of a strategically important hill. It can be beneficial for a command group to establish a headquarters at the top of the hill since the hill can provide a valuable field of vision for commanders. To make adequate decisions, the headquarters can have power, data, and telephone capabilities that allow information to be sent and received. With the complexity of modern technology, it can be a difficult process to individually place wires for the headquarters.

With employment of a set of rapid deployment communications tiles the headquarters can be quickly and securely created in a relatively short amount of time. These tiles can be fabricated with conduits for transfer of power, data, and other capabilities. These tiles can link together to create a tile environment where power, data, and other resources can travel from a source (e.g., a generator) to a destination (e.g., an electrical outlet) without exposed wires from the source to the destination.

A designer can determine a configuration for a set of tiles and the set of tiles can be placed together into the configuration. If the configuration is not found to be suitable, then individual tiles can be moved and/or exchanged such that a new configuration is used. Thus, a tile environment can fit specific needs of a situation, terrain, etc.

Further, various safety and maintenance features can be exploited by using the rapid deployment communication tiles. The tiles can have conduits within them that interlink together. An outer material of the tiles can protect the conduits from environmental elements. Also, since the conduits are within the tiles, the conduits do not pose a tripping hazard or other hazards such as dangers from exposed power cables. Therefore, the tile environment provides a safe environment that can be quickly constructed and deconstructed.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components. The term component can be interchangeable and have the same meaning as the term module.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, methods, threads, and/or programs including separate applications or code from dynamically linked libraries.

Figure 1:
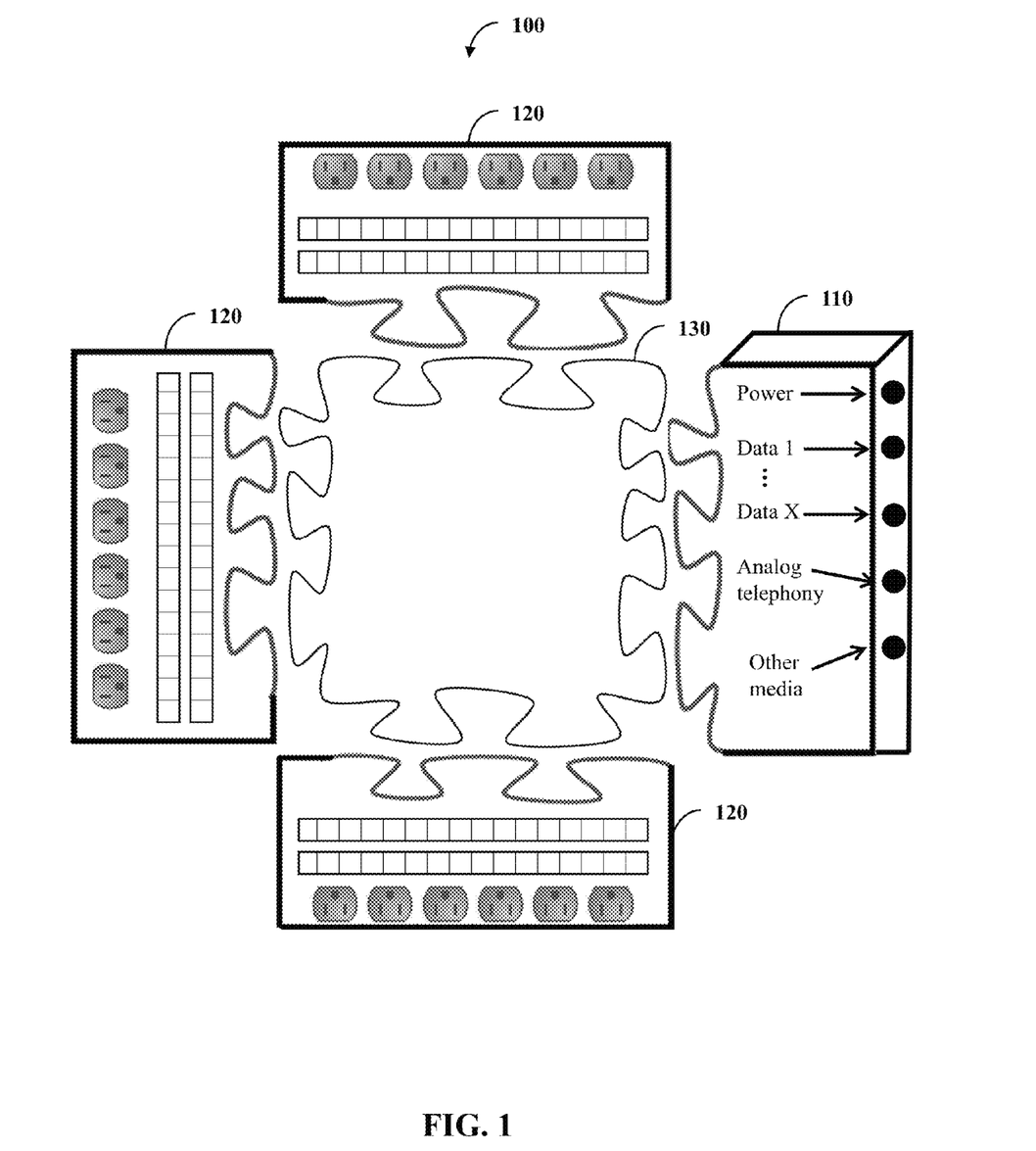
FIG. 1 illustrates one embodiment of a system comprising a supply tile, three access tiles, and a transmission tile.

FIG. 1 illustrates one embodiment of a system 100 comprising a supply tile 110, three access tiles 120, and a transmission tile 130. The transmission tile 130 and the access tile 120 can be operatively coupled together and interconnect with one another in a keyed manner. In addition, the supply tile 110 and the transmission tile 130 can be operatively coupled together and interconnect with one another in a keyed manner. Additionally, the supply tile 110 and an access tile 120 can be operatively coupled together and interconnect with one another in a keyed manner. Interconnections as described can lead to the supply tile 110, the access tile 120, and the transmission tile 130 forming a substantially flat floor surface as a tile environment. The tiles 110-130 can be made of a material, such as a strong rubber composite, that allows for the tiles to be used as a floor (e.g., strong enough to have a truck drive upon the floor without functional damage to the tiles 110-130).

The supply tile 110 can be configured to supply a media (e.g., power, data, telephone, other), such as supplying the media to other tiles (e.g., directly to the transmission tile 130 and ultimately to the access tile 120). This supplying can be done through wiring. In one example, the supply tile 110 can connect to a source for the media (e.g., a generator that provides the power) such as by way of an illustrated connection point. The connection points that are illustrated can be on a top, side, and/or bottom of the supply tile 110 (e.g., a part that is not configured to interlock with another tile).

The access tile 120 can be configured to afford access to the media. As shown, the access tile 120 can have a series of plugs that allow for power access. In addition, the access tile 120 can have jacks that enable use of data and/or telephone communication. The plugs and/or jacks can be on the tile's top, bottom, or on flat edge. The access tile 120 can have a wireless emitter that facilitates wireless access to power, data, or telephone capabilities.

The transmission tile 130 can be configured to transmit the media supplied by the supply tile 110 to the access tile 120. The transmission tile 130 can function as a go between for the supply tile 110 and the access tile 120. Multiple transmission tiles can chain together such that the supply tile 110 and the access tile 120 are relatively far apart from one another. As part of being chained together, keyed portions of the tiles can interlock to create a uniform surface even if this surface is not level.

It is to be appreciated by one of ordinary skill in the art that FIG. 1 illustrates but one possible configuration of the system 100. In one example, an end tile can be used such that the system does not have a keyed edge. In another example, the tiles 110-120 may have more than one keyed side while the transmission tile 130 can have less than four keyed sides. Further, tiles can be multi-functional—in one example the access tile 120 can function as a transmission tile 130 as well such that another connected tile can afford access.

Figure 2:
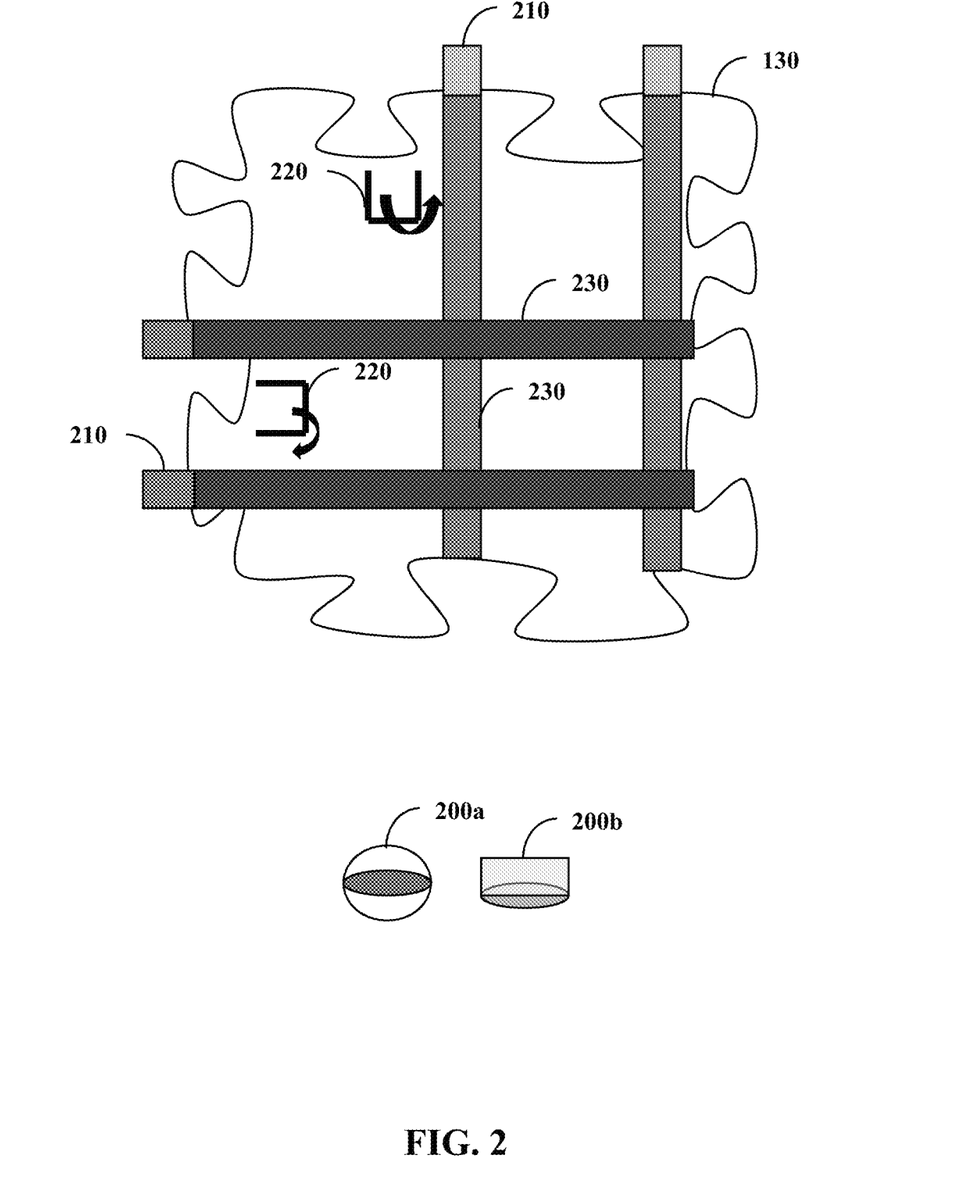
FIG. 2 illustrates one embodiment of the transmission tile, a top view of a knob, and a side view of the knob.

FIG. 2 illustrates one embodiment of the transmission tile 130, a top view of a knob 200a and a side view of the knob 200b. The transmission tile 130 can have connectors 210, engagement portions 220, and channels 230. While multiple of these are illustrated, it is to be appreciated by one of ordinary skill in the art that a tile may have but one of each, such as one connector 210. The connectors 210 can function such that they connect with connectors of other tiles and/or channels of other tiles (e.g., the supply tile 110 of FIG. 1 and/or the access tile 120 of FIG. 1) so that the tiles are operatively coupled to one another. Connection of the connectors 210 with one another or other channels can be controlled by the engagement portions 220.

The engagement portions 220 can cause the transmission tile 130 to operatively couple with the supply tile 110 of FIG. 1 (e.g., by way of the left connectors 210) and the access tile 120 of FIG. 1 (e.g., by way of the upper connectors 210) such that they function together as one pathway and are environmentally sealed. Further, the engagement portions 220 can function as disengagement portions that cause the transmission tile 130 to operatively dis-couple with the supply tile 110 of FIG. 1 and/or the access tile 120 of FIG. 1. In one embodiment, the individual engagement portion 220 can be a handle, a screw (e.g., manipulated by an outside tool such as a screwdriver), or the knob 200 (illustrated by views 200a and 200b) that is manipulated by a user (e.g., a first position for engagement and a second position for disengagement). The engagement portions 220 can have access to a door or cover such that the engagement portions 220 are not exposed when not in use (e.g., a door that allows for access from the top of the transmission tile 130) so as not to create a tripping hazard. Also, the engagement portions 220 can be in a compartment that is environmentally sealed (e.g., when not in use). In one embodiment, the engagement portions 220 and/or the connectors 210 can be a magnetic unit that can couple when two connectors (e.g., one connector 210) contact one another and/or a signal is received for the magnetics to connect. In one embodiment, the connectors 210 are held within the channels 230 and when one of the engagement portions 220 is engaged, the connectors 210 extrude out from the channels 230 (e.g., this is limited to when the channels 230 are correctly aligned with other channels of another tile such that operative coupling occurs). In one embodiment, the channels 230 can have one end with the connectors 210 and one end able to receive a connector of another channel from another tile.

The channels 230 can be hardware elements that are used for transmission of the media. The channels 230 can function as a pathway that transfers the media from the supply tile 110 of FIG. 1 to the access tile 120 of FIG. 1 and can be part of these tiles as well. The channels 230 can also function to transfer the media from the access tile 120 of FIG. 1 to the supply tile 110 of FIG. 1. In this example, two-way media communication can occur between a server connected to the supply tile 110 of FIG. 1 and a terminal that gains access to the server by way of the access tile 120 of FIG. 1. The channels 230 can be made of such a material (e.g., plastic) that they do not corrode in the presence of salt and the transmission tile 130 can be used when heavy salt is expected (e.g., a snowy area where salt is used to de-ice roads).

Figure 3:
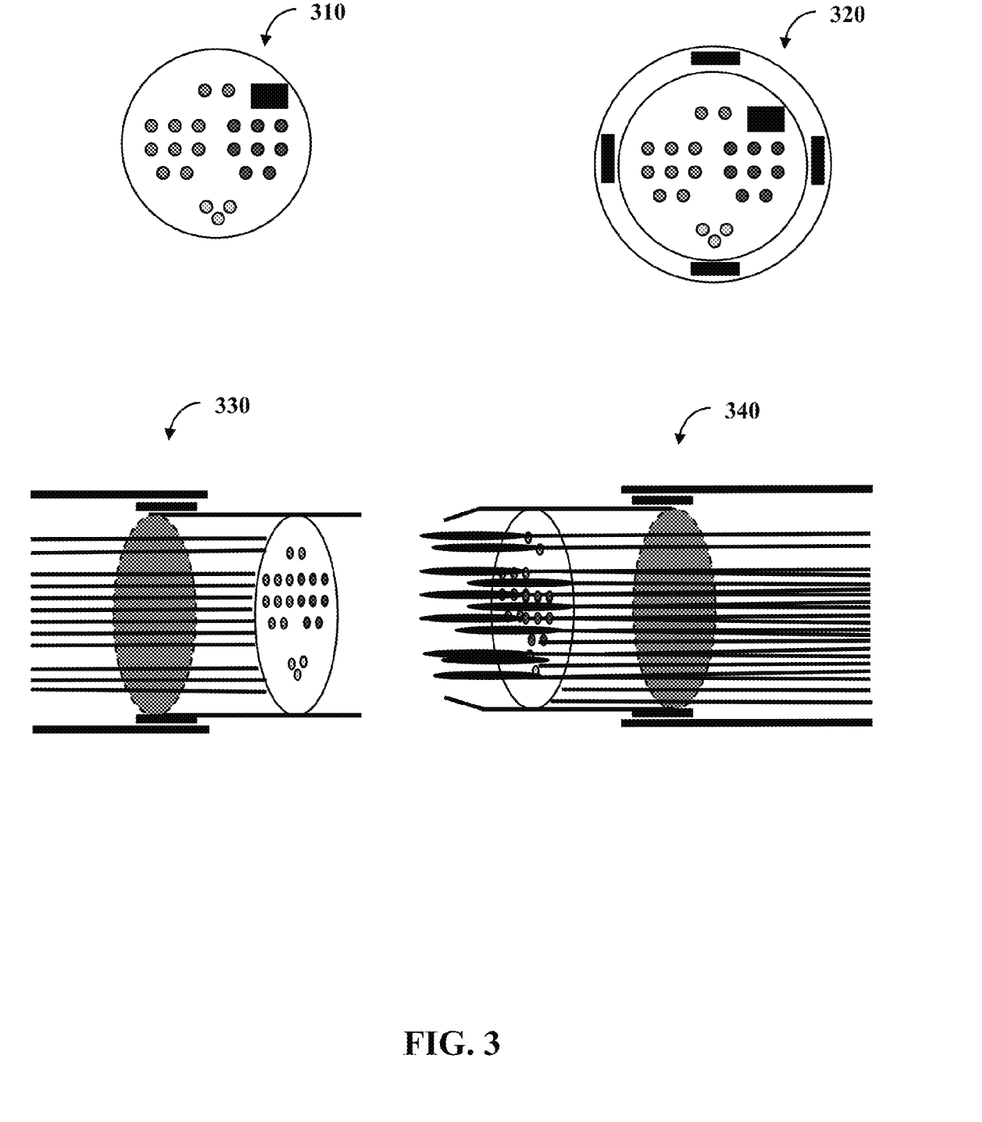
FIG. 3 illustrates one embodiment of an unprotected channel, a protected channel, a receptor environment, and a connector environment.

FIG. 3 illustrates one embodiment of an unprotected channel 310, a protected channel 320, a receptor environment 330, and a connector environment 340. The channels 310 and 320 can individually function as the channel 230 of FIG. 2 and can engage with one another or with similar channels (e.g., the unprotected channel 310 can engage with the protected channel 320 that is part of another tile). The channels 310 and 320 can have different cables, such as a power cable, an analog telephone cable, two different data cables (e.g., Ethernet cables and fiber optic cables), and a cable for other media types. In one example, the media comprises power and data and in turn the channels 310 and 320 comprise a data cable that transmits the data and a power cable that transmits the power. The protected channel 320 can comprise an outer layer that environmentally seals the data cable and the power cable. Further, the channels 310 and 320 can be surrounded by an outer material of the transmission tile 130 of FIG. 1 with the exception of end interconnection portions of the conduit (e.g., the connectors 210 of FIG. 2) which can go outside the material (e.g., when instructed). This can be in addition to the outer layer of the protected channel 320 or be the outer layer.

For the channels 310 and 320 the upper right black block can be for other media while the upper two cables can be for analog telephone. The left-central eight cables can be for one Ethernet pathway while the right-central eight cables can be for a different Ethernet pathway. The lower three cables can be for power. While the channels 310 and 320 are shown as having multiple capabilities (e.g., power and analog telephone), it is to be appreciated that the channel can be dedicated to one capability and/or the transmission tile 130 of FIG. 1 can have multiple channels with each channel dedicated to a capability.

Two of the channels 310 (or 320) can engage with one another as shown by the interaction of the receptor environment 330 (female end) and a connector environment 340 (male end). The connector environment 340 can include the connector 210 of FIG. 2 in addition to the channel 230 of FIG. 2. The environments show pins, receptors for reception of the pins, the outer layer, a flexible material between the outer layer and the connector, chamfers that extend from the connector, and a flex point (e.g., a flex point that allows for connection on uneven surfaces). The channels 310 or 320 can include the connectors 210 of FIG. 2 that are recessed before engagement and, once the portion 220 of FIG. 2 is engaged, are no longer recessed and form an environmental seal with another channel of tile. To help facilitate interconnection of channels, physical guides, such as rails, can be used to make quick connection. These environments 330 and 340 illustrate how channels from two different tiles (e.g., two transmission tiles 130 of FIG. 1, the transmission tile 130 of FIG. 1 and the access tile 120 of FIG. 1) can engage with one another (e.g., engage in response to a command from the engagement portion 220 of FIG. 2). When engaged with one another, the channels can form into one channel that is environmentally sealed (e.g., through use of one or more connectors 210 of FIG. 2.

Figure 4:
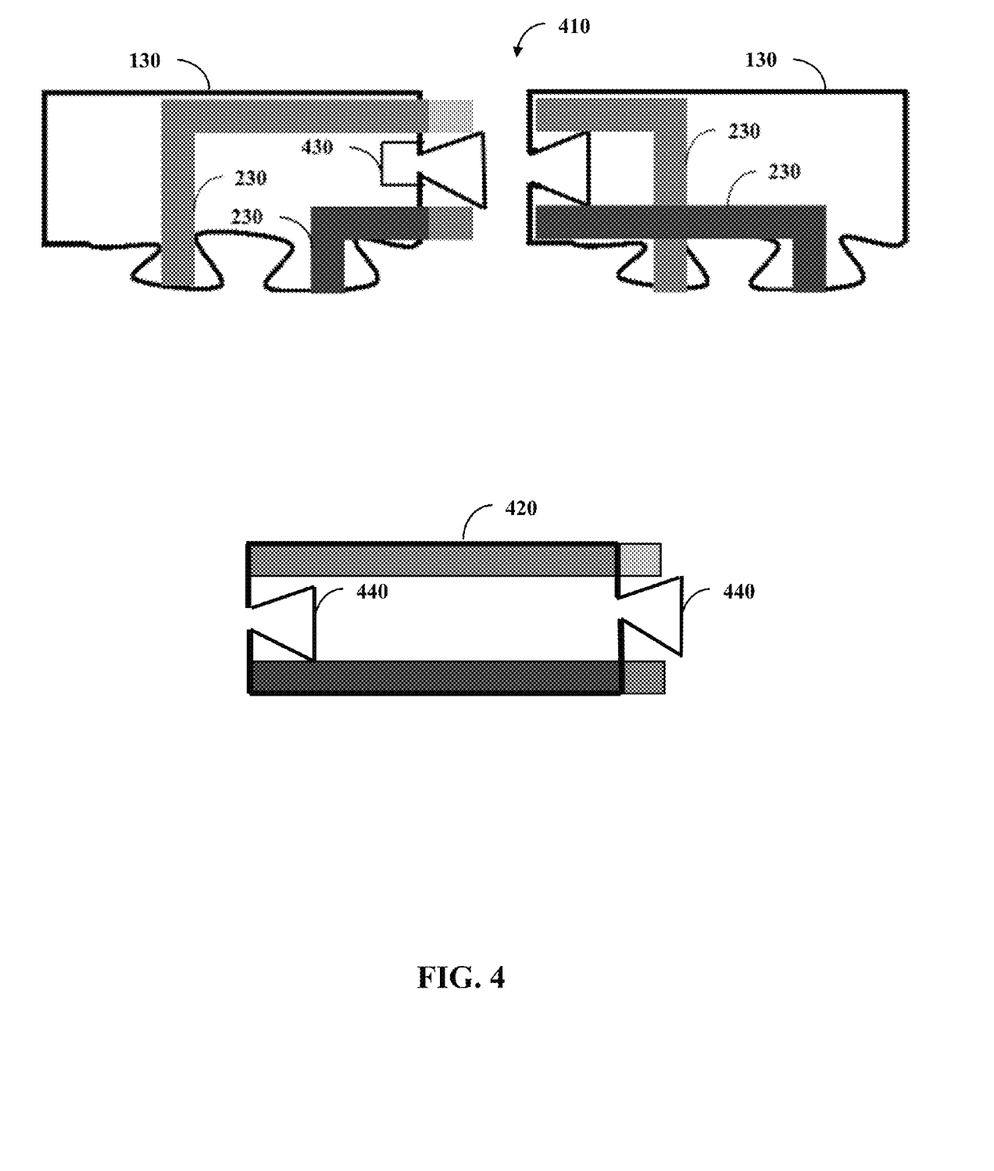
FIG. 4 illustrates one embodiment of a connection environment and an extender.

FIG. 4 illustrates one embodiment of a connection environment 410 and an extender 420. The connection environment 410 has a lever 430 (e.g., an example engagement portion 220) between the two channels 230 to facilitate engagement of the two transmission tiles 130 and in turn the engagement of appropriate channels 230. The two transmission tiles 130 and the extender 420 can have their own keyed portions 440 to facilitate engagement and/or flush interconnection of tiles. The extender 420 can be used to make allowances for a tile configuration when appropriate.

The extender 420, along with other tiles, can include a keyed portion 440 along with a non-keyed portion. The non-keyed portion can be along a top, bottom, or edge. This non-keyed portion, as well as the keyed portion, can include ports that allow for access to the channels 230. A port can be a connection point that allows a channel to be tapped down-path. This channel tapping can be for input and/or output. In one example, returning to FIG. 1, the supply tile 110 of FIG. 1 can supply telephone and power, the transmission tile 130 of FIG. 1 can include a telephone channel and a power channel, and the access tile 120 of FIG. 1 can enable access to telephone and power capabilities. The transmission tile 130 of FIG. 1 can include two ports—one for telephone and one for power. The telephone port can enable use of the telephone channel while still allowing access at the access tile 120 of FIG. 1. Similarly, the power port can be connected to a back-up generator to supply power in case of a failure with the supply tile 110 of FIG. 1 and/or a generator connected to the supply tile 110 of FIG. 1.

Figure 5:
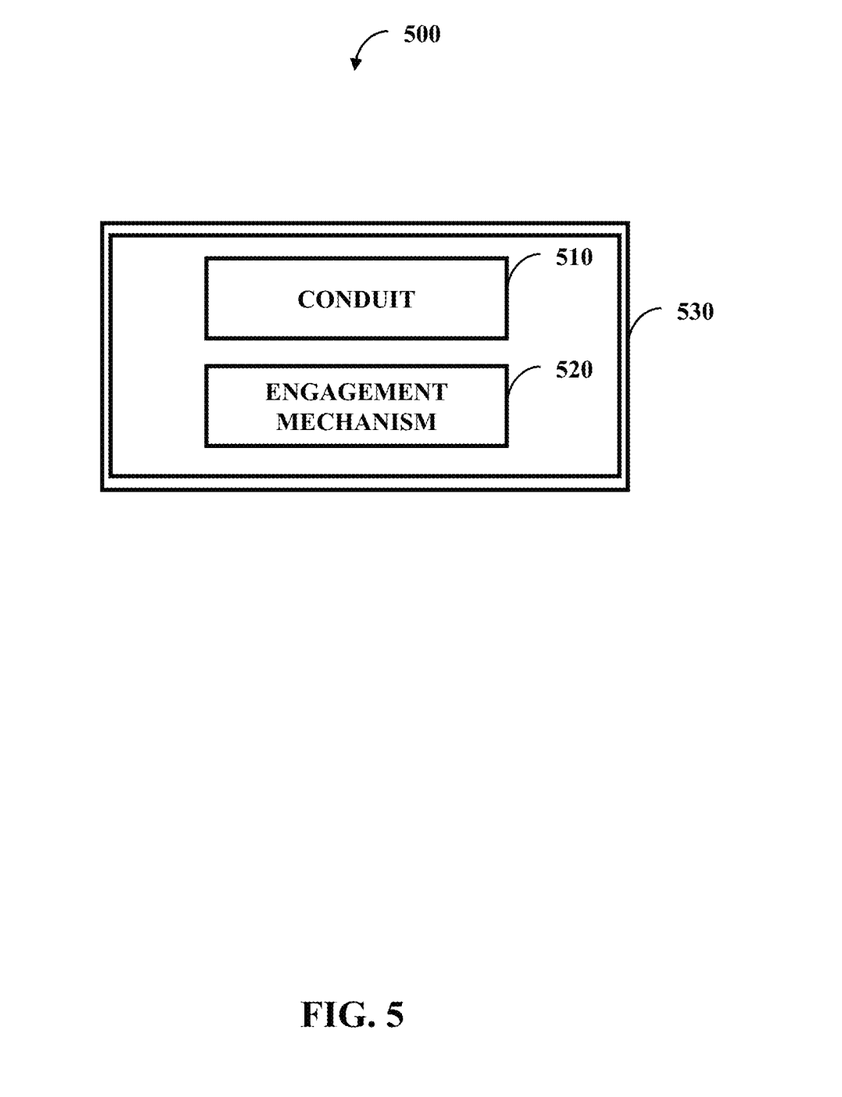
FIG. 5 illustrates one embodiment of a system comprising a conduit and an engagement mechanism.

FIG. 5 illustrates one embodiment of a system 500 comprising a conduit 510 and an engagement mechanism 520. The system 500 can be a first tile (e.g., the supply tile 110 of FIG. 1, the access tile 120 of FIG. 1, or the transmission tile 130 of FIG. 1). The conduit 510 (e.g., the channel 230 of FIG. 2) can transmit a media upon the first tile (e.g., across at least part of the first tile, to the first tile, and/or from the first tile). The engagement mechanism 520 (e.g., the engagement portion 220 of FIG. 2) can cause the conduit 510 to operatively couple with a second tile (e.g., a conduit of the second tile by way of a connector of at least one of the conduits) and cause the conduit 510 to operatively dis-couple from the second tile (e.g., dis-couple with the conduit of the second tile by way of the connector of at least one of the conduits). The second tile can comprise an external access portion that enables access to the media through the second tile (e.g., be the access tile 120 of FIG. 1), can comprise a supply portion that supplies the media to the first tile (e.g., be the supply tile 110 of FIG. 1), or can be the transmission tile 130 of FIG. 1. This operative coupling can be such that the media travels upon the conduit 510 of the first tile in connection with travelling upon the second tile.

The conduit 510 can be a first conduit while the second tile comprises a second conduit that transmits the media across the second tile. The engagement mechanism 520 can function such that the first conduit and the second conduit engage with one another. Engaging with one another includes functioning into a single pathway that stretches multiple tiles upon which the media can travel. In this, the media can travel across the first conduit and the second conduit in series (e.g., media flows through the first conduit and then the second conduit with or without still flowing through the first conduit).

The media can be, for example, data, power, or analog telephone. In one embodiment, the conduit 510 can retain a cable dedicated to a media type. With this, the conduit 510 can retain a data cable that transmits the data, a power cable that transmits the power, and an analog telephone cable that transmits analog telephone information. These cables can be environmentally sealed by an outer layer of the conduit 510 and in turn be protected from outside elements to which the first tile may be exposed. The seal can be at the cable-level so a cable has its own seal or done at the conduit-level such that the conduit 510 physically retains the cables and protection of the conduit 510 leads to protection of the cables.

The first tile and the second tile can interconnect with one another to form a substantially flat surface. The first tile and the second tile can be keyed such that the first tile and second tile fit together when the first conduit and second conduit align and such that the first tile and second tile do not fit together when the first conduit and second conduit do not align. With this, tiles can be specifically designed in a manner similar to that of a puzzle. The keying can be so that the tiles only fit together when correct alignment occurs and this should make construction of the tile environment easier.

Using the transmission tile 130 as illustrated in FIG. 2 as an example, the channels 230 of FIG. 2 are shown as being able to extrude out the left and the top side by way of the connectors 210 of FIG. 2 while the lower and right sides can be receiver area that can receive connectors of another tile (although this is one configuration and in another configuration the channels can extrude out of a different number of sides such as all four sides and the connectors interlock in a manner different than male and female such as through flat contact). To put another way, the upper and left sides of the transmission tile 130 of FIG. 2 can be male ends while the right and lower sides of the tile 130 of FIG. 2 can be female ends. If one were to try to align two male ends, then the keying of the tiles would not align together and therefore the tiles would not fit in an interconnected manner to form a substantially flat surface. This would indicate to a construction team member that orientation of the second tile should be changed.

The system 500 also comprises a housing 530 that can be, in one embodiment, a rubber material that protects the conduit 510 such that the conduit 510 is not exposed on the top, bottom, and/or at least one side surface of the first tile. The first tile and the second tile can be floor tiles that when interconnected create a floor surface. The floor tiles can be strong enough to withstand foot traffic as well as truck/transit traffic without damaging or impacting success of the conduit 510. While illustrated with a housing that protects the top and bottom, it is to be appreciated by one of ordinary skill in the art that the system 500 can function absent such a housing.

Figure 6:
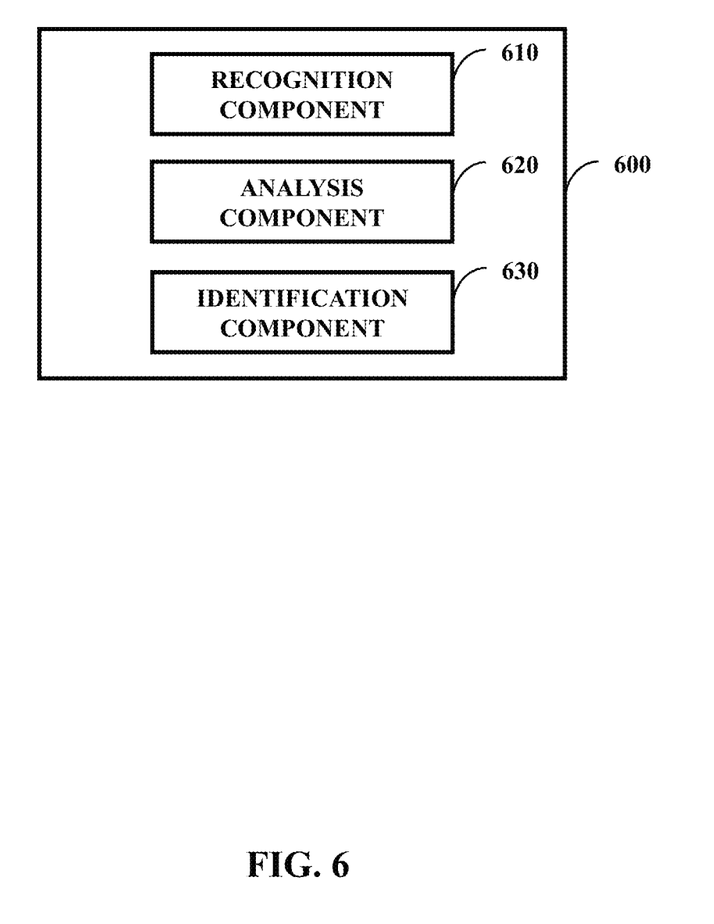
FIG. 6 illustrates one embodiment of a system comprising a recognition component, an analysis component, and an identification component.

FIG. 6 illustrates one embodiment of a system 600 comprising a recognition component 610, an analysis component 620, and an identification component 630. The recognition component 610 can recognize a situation where a transmission failure occurs in a tile environment (e.g., the system 100 of FIG. 1). The analysis component 620 can analyze the tile environment to produce an analysis result. The identification component 630 can identify a failure tile of the tile environment that causes the transmission failure, where the failure is identified through use of the analysis result. The tile environment can comprise a plurality of interlocking tiles that form a floor-based environment. These tiles are operatively coupled to one another and can be used to transmit media from one location of the tile environment (e.g., the supply tile 110 of FIG. 1) to another (e.g., the access tile 120 of FIG. 1).

In one embodiment, the tile environment can be a plurality of floor tiles with some tiles being supply tiles, some tiles being transmission tiles, and some tiles being access tiles. A user can attempt to access power from a specific access tile and the power can be unavailable. The user can send in a failure notification to the system 600 and the recognition component 610 can recognize from this request that a failure to deliver power to the specific access tile occurs. The analysis component 620 can perform diagnostic evaluations on the tile environment, such as through sending and receiving test signals, and process the results. The identification component 630 can interpret these results and determine why the failure occurs. In this example, the test signals can indicate that when the signals reach a specific floor tile, the signals do not exit that floor tile. The identification component 630 can determine through internal logic that this means that the specific floor tile is not functioning correctly. With this situation, the identification component 630 or another component can try to correct the failing tile or send a notification for a construction crew member to fix or replace the failing tile.

Figure 7:
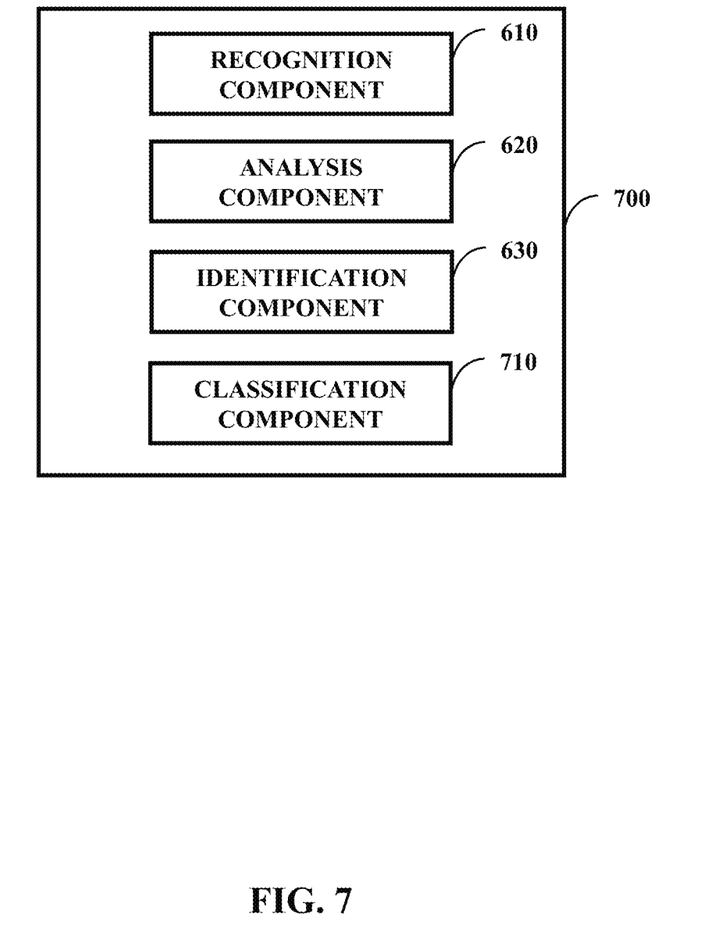
FIG. 7 illustrates one embodiment of a system comprising the recognition component, the analysis component, the identification component, and a classification component.

FIG. 7 illustrates one embodiment of a system 700 comprising the recognition component 610, the analysis component 620, the identification component 630, and a classification component 710. The classification component 710 can classify a type of the failure tile (e.g., from among access tile-type, transmission tile-type, or supply tile-type), where the failure tile is replaceable with a replacement tile of the type. In one example, the classification component 710 can determine that the failure tile is a transmission tile. A communication component or the identification component 630 can notify a central server of the failure and of the type so a construction crew member knows what type of tile is to be replaced (e.g., replace a transmission tile with another transmission tile as opposed to a different tile type).

Replacement of the tile can be performed by the construction crew member through use of a mechanism (the engagement mechanism 520 of FIG. 5). The crew member can place the mechanism in a first position to operatively de-couple the failure tile from the tile environment. The crew member can then remove the failure tile and replace the failure tile with the replacement tile. With the replacement tile in place the crew member can place the mechanism in a second position to operatively couple the replacement tile to the tile environment. This can be done on multiple tiles (e.g., the replacement tile and a tile that connects to the replacement tile). In one embodiment, mechanisms on both tiles are engaged for coupling to occur while in another embodiment just one mechanism is engaged for coupling.

Figure 8:
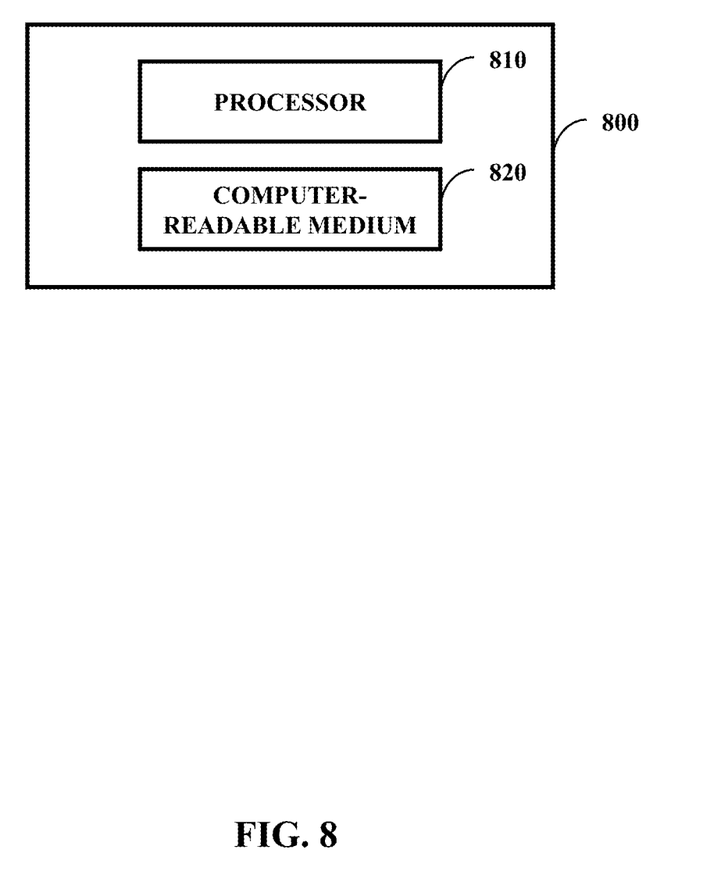
FIG. 8 illustrates one embodiment of a system comprising a processor and a computer-readable medium.

FIG. 8 illustrates one embodiment of a system 800 comprising a processor 810 and a computer-readable medium 820 (e.g., non-transitory computer-readable medium). In one embodiment, the computer-readable medium 820 is communicatively coupled to the processor 810 and stores a command set executable by the processor 810 to facilitate operation of at least one component disclosed herein (e.g., the recognition component 610 of FIG. 6). In one embodiment, at least one component disclosed herein (e.g., the analysis component 620 of FIG. 6) can be implemented, at least in part, by way of non-software, such as implemented as hardware by way of the system 800. In one embodiment, the computer-readable medium 820 is configured to store processor-executable instructions that when executed by the processor 810 cause the processor 810 to perform a method disclosed herein (e.g., the methods 900-1000 addressed below).

Figure 9:
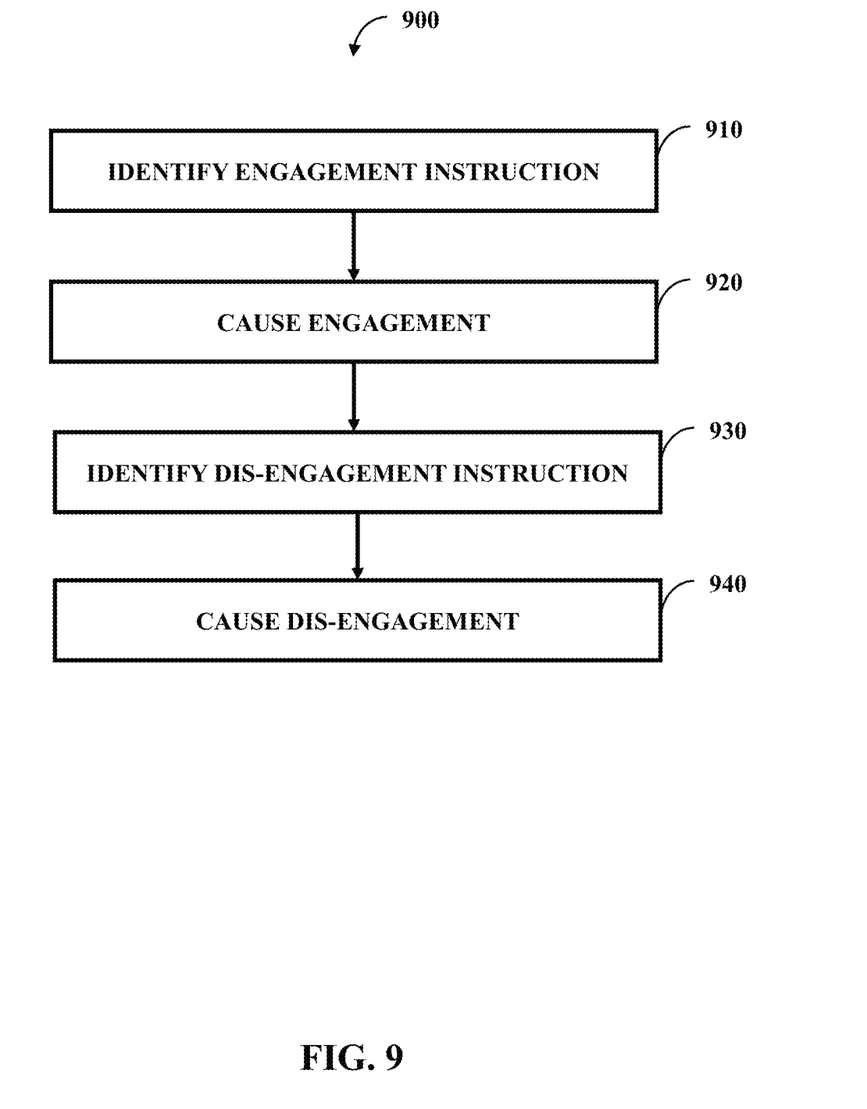
FIG. 9 illustrates one embodiment of a method comprising four actions.

FIG. 9 illustrates one embodiment of a method 900 comprising four actions 910-940. The method 900 can be how the engagement mechanism 520 of FIG. 5 functions, such as when the mechanism is a component controlled magnet apparatus that may or may not include a controller component that controls the mechanism. At 910 an engagement instruction is identified and at 920 the instruction is followed such that engagement occurs. At 930 a dis-engagement instruction is identified and at 940 the instruction is followed such that dis-engagement occurs. In one embodiment, once two tiles are properly aligned (e.g., are flush with one another and their keys correctly interlock) they can proactively (e.g., automatically) engage (e.g., have their conduits function as one pathway). The mechanism can be a button that causes dis-engagement from this situation. This button can cause dis-engagement for all tiles of the tile environment or a select tile set (e.g., one or more tiles) so that other functionality remains.

A plurality of tiles can be connected to create the tile environment. In one example, each time a tile is keyed with another tile, engagement of tile channels occurs. In another example, when a tile is completely surrounded or is not anticipated to have another tile connected, engagement of the tile channel(s) then occurs for that tile. In yet another example, tiles can be interlocked together and once in place a command can be sent causing all connectors to simultaneously engage with other channels to create the environmentally protected pathways. A tile can include a component that determines if a tile is connected at a certain end and if the tile is not connected then the connector remains within the channel so as not to environmentally expose the channel and/or the connector. If the tile is connected at a certain end, then a connector of the tile can engage and form a pathway with another tile.

Figure 10:
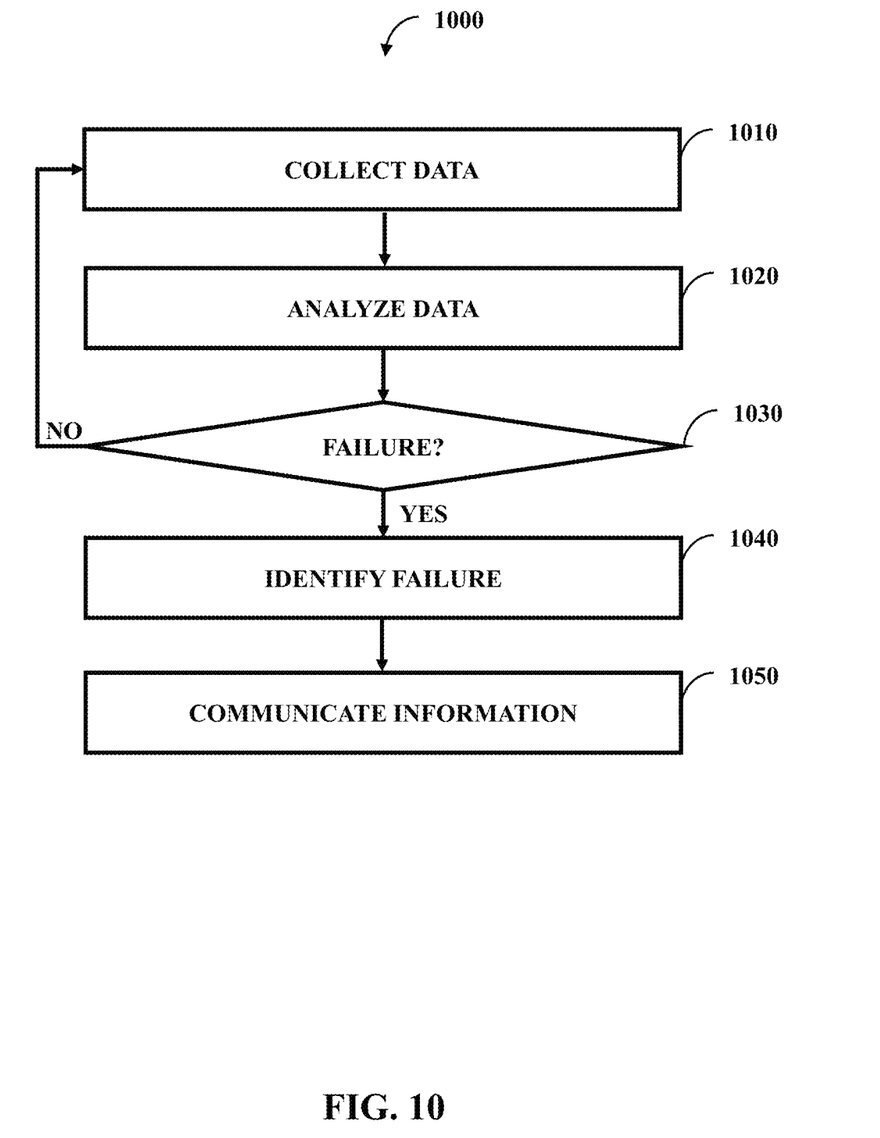
FIG. 10 illustrates one embodiment of a method comprising five actions.

FIG. 10 illustrates one embodiment of a method 1000 comprising five actions 1010-1050. The method 1000 can function on how to identify a tile failure. Data can be collected at 1010 and analyzed at 1020 that pertains to operation of the tile environment. At 1030 a check can be made on if a failure occurs. If no failure occurs then more data can be collected and as more data is collected more analysis can be performed. If there is a failure, then the failure can be identified at 1040 and information about the failure can be communicated at 1050. The method 1000 can identify what tile fails, but also why a tile fails. In one example, a time-stamp for the failure can be identified at 1030 and 1040 and this time-stamp can be aligned with when a strong force was placed on the tile (e.g., a piece of equipment was dropped as opposed to placed down gently). This can signify that the tile environment should not be subjected to the strong force in the future. Further, the method 1000 can include correction of the failure, such as an attempt to reroute data through available channels.

The tile environment can be built by a construction crew over an existing floor or over a non-uniform surface (e.g., the tiles can bend to match curvature of the non-uniform surface or the tiles shift if sand underneath the tiles moves without causing disconnection of channels from one another). The tile environment can be placed, as examples, in an open air environment (e.g., outside on the ground exposed to the elements), in a vehicle, within a wall, or within a ceiling tile. A set of tiles can be transported and this can be easier logistically since individual cables may not be transported (or less cables may be transported) since cables are integrated into the tiles (e.g., tiles have pre-fabricated conduits built-in). This can reduce construction time, manpower requirements (e.g., less number of workers and/or less skilled workers), and build complexities.

Further, the tile environment can be multi-dimensional. In one example, a number of the tiles can be floor tiles, but some tiles can connect in an elbow manner to sit 90 degrees from the floor tiles. In this example, access tiles can be at the 90 degree position to simulate wall outlets and/or partition outlets and thus function as a wall or partition. With this, the connectors 210 of FIG. 2 can connect in various directions (e.g., with channels directly across from the channels 230 of FIG. 2 or with channels perpendicular to the channels 230 of FIG. 2). In another example, an entire room or parts of a room can be made of tiles including floor, walls, and a ceiling. The tiles can be uniform or vary in size, depth, etc.

Tiles disclosed herein can include hinges. These hinges can be used to aid in the tiles fitting along non-uniform spaces. In addition, these hinges can be used to transition a tile environment from a floor portion to a wall portion. A tile itself can have one or more hinge portions and/or tiles can interconnect such that the interconnection can be hinged. This hinging can be such that in various positions environmental protection is maintained, such as through use of a flexible cover.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:
   a first tile, comprising:
      a conduit that transmits a media upon the first tile; and
      an engagement mechanism configured to allow the conduit of the first tile to operatively couple with a conduit of a second tile such that the media travels upon the conduit of the first tile in connection with travelling upon the second tile,
   where the engagement mechanism comprises a male connector configured to operatively couple the conduit of the first tile to the second tile,
   where the male connector is configured to be retracted within the first tile when the conduit of the first tile is not operatively coupled with the second tile, and
   where the male connector is configured to be extended beyond the first tile when the conduit of the first tile is operatively coupled with the second tile.

2. The tile of claim 1,
   where the first tile and the second tile interconnect with one another to form a substantially flat surface.

3. The system of claim 2,
where the conduit of the second tile transmits the media across the second tile,
where the engagement mechanism functions such that the conduit of the first tile and the conduit of the second tile engage with one another, and
where the media travels across the conduit of the first tile and the conduit of the second tile in series.

4. The system of claim 3,
where the first tile and the second tile are keyed such that the first tile and second tile fit together when the conduit of the first tile and the conduit of the second tile align and such that the first tile and second tile do not fit together when the conduit of the first tile and the conduit of the second tile do not align.

5. The system of claim 2, the first tile comprising:
a keyed hardware portion configured to facilitate the interconnection with the second tile such that the conduit is physically aligned with the conduit of the second tile such that the operative coupling can occur.

6. The system of claim 1,
where the second tile comprises an external access portion that enables access to the media through the second tile to a non-tile.

7. The system of claim 1,
where the second tile comprises a supply portion that supplies the media to the first tile.

8. The system of claim 7,
where the second tile comprises a reception portion that obtains the media from a non-tile.

9. The system of claim 1,
where the media comprises data and power and
where the conduit comprises:
a data cable that transmits the data;
a power cable that transmits the power; and
an outer layer that environmentally seals the data cable and the power cable.

10. The system of claim 1,
where the conduit is not exposed on a top surface of the first tile.

11. The system of claim 1, the first tile comprising:
a handle configured to control the retraction and the extension of the male connector.

12. A system comprising:
a transmission tile configured to transmit a media supplied by a supply tile to an access tile,
where the supply tile and the transmission tile are operatively coupled together and interconnect with one another in a keyed manner,
where the transmission tile and the access tile are operatively coupled together and interconnect with one another in a keyed manner,
where the transmission tile comprises an engagement portion configured to operatively couple and dis-couple the transmission tile with the access tile, and
where the engagement portion comprises a connector configured to allow the transmission tile to operatively dis-couple with the access tile by way of retraction of the connector to within the transmission tile.

13. The system of claim 12,
where the media comprises power and data,
where a channel comprises a data cable configured to transmit the data; a power cable configured to transmit the power; and an outer layer configured to environmentally seal the data cable and the power cable,
where the channel is, at least in part, part of the transmission tile, and
where the channel is a pathway that transfers the media from the supply tile to the access tile.

14. The system of claim 13,
where the channel is surrounded by an outer material of the transmission tile with the exception of end interconnection portions of the channel.

15. The system of claim 12,
where the supply tile, the access tile, and the transmission tile form a substantially flat floor surface.

16. The system of claim 12,
where the supply tile and the transmission tile are operatively coupled together to form at least part of a continuous conduit upon which the media travels,
where the transmission tile and the access tile are operatively coupled together to form at least part of the continuous conduit upon which the media travels,
where the transmission tile comprises an integrated cable that forms part of the continuous conduit,
where the transmission tile comprises the integrated cable prior to the supply tile and the transmission tile being operatively coupled together, and
where the transmission tile comprises the integrated cable prior to the transmission tile and the access tile being operatively coupled together.

17. The system of claim 12, the transmission tile comprising a second engagement portion having a second male connector configured to operatively couple with the supply tile by way of extension of the second male connector from within the transmission tile.

18. The system of claim 12,
where the supply tile comprises a reception portion that obtains the media from a non-tile.

19. The system of claim 12,
where the access tile comprises an external access portion that enables access to the media through the second tile to a non-tile.

20. The system of claim 12, the transmission tile comprising:
a conduit configured to facilitate transmission of the media; and
a port configured to facilitate a tap of the conduit.

* * * * *